United States Patent [19]

Zambelli et al.

[11] Patent Number: 4,542,983

[45] Date of Patent: Sep. 24, 1985

[54] MULTI-MAGNIFICATION REPRODUCTION DEVICE UTILIZING LINEAR LENS ASSEMBLY

[75] Inventors: Robert G. Zambelli, Rochester; David K. Shogren, Ontario, both of N.Y.

[73] Assignee: Xerox Corporation, Stamford, Conn.

[21] Appl. No.: 536,938

[22] Filed: Sep. 29, 1983

[51] Int. Cl.[4] ........................ G03B 27/32; G02B 5/16
[52] U.S. Cl. ......................................... 355/55; 355/1; 355/58
[58] Field of Search .................... 355/1, 55, 58, 8, 11

[56] References Cited

U.S. PATENT DOCUMENTS

| | | | |
|---|---|---|---|
| 3,544,190 | 12/1970 | Moorhusen et al. | 350/6 |
| 3,658,407 | 4/1972 | Kitano et al. | 350/96 B |
| 4,194,827 | 3/1980 | Bleeker et al. | 355/1 |
| 4,331,380 | 5/1982 | Rees et al. | 355/1 X |
| 4,397,409 | 8/1983 | Fantuzzo et al. | 222/414 |

FOREIGN PATENT DOCUMENTS 58-21764  2/1983  Japan ................................ 355/55

Primary Examiner—L. T. Hix
Assistant Examiner—Della J. Rutledge

[57] ABSTRACT

The invention discloses an imaging system for a reproduction device for reproducing a document at reduced or enlarged magnification, as well as unity magnification. The system includes at least two linear lens arrays, one lens array providing the 1:1 magnification and the second array adapted to provide a reduced or enlarged image depending upon its vertical orientation. Mechanical arrangements are disclosed which translate a magnification selection into the position of the appropriate lens array into the optical path. This positioning includes both horizontal and rotational movement of the lens arrays. A magnification selection also enables a platen (or document) drive system which selects the proper document scanning speed for that magnification. In a disclosed embodiment the linear lens arrays are gradient index lens arrays.

3 Claims, 11 Drawing Figures

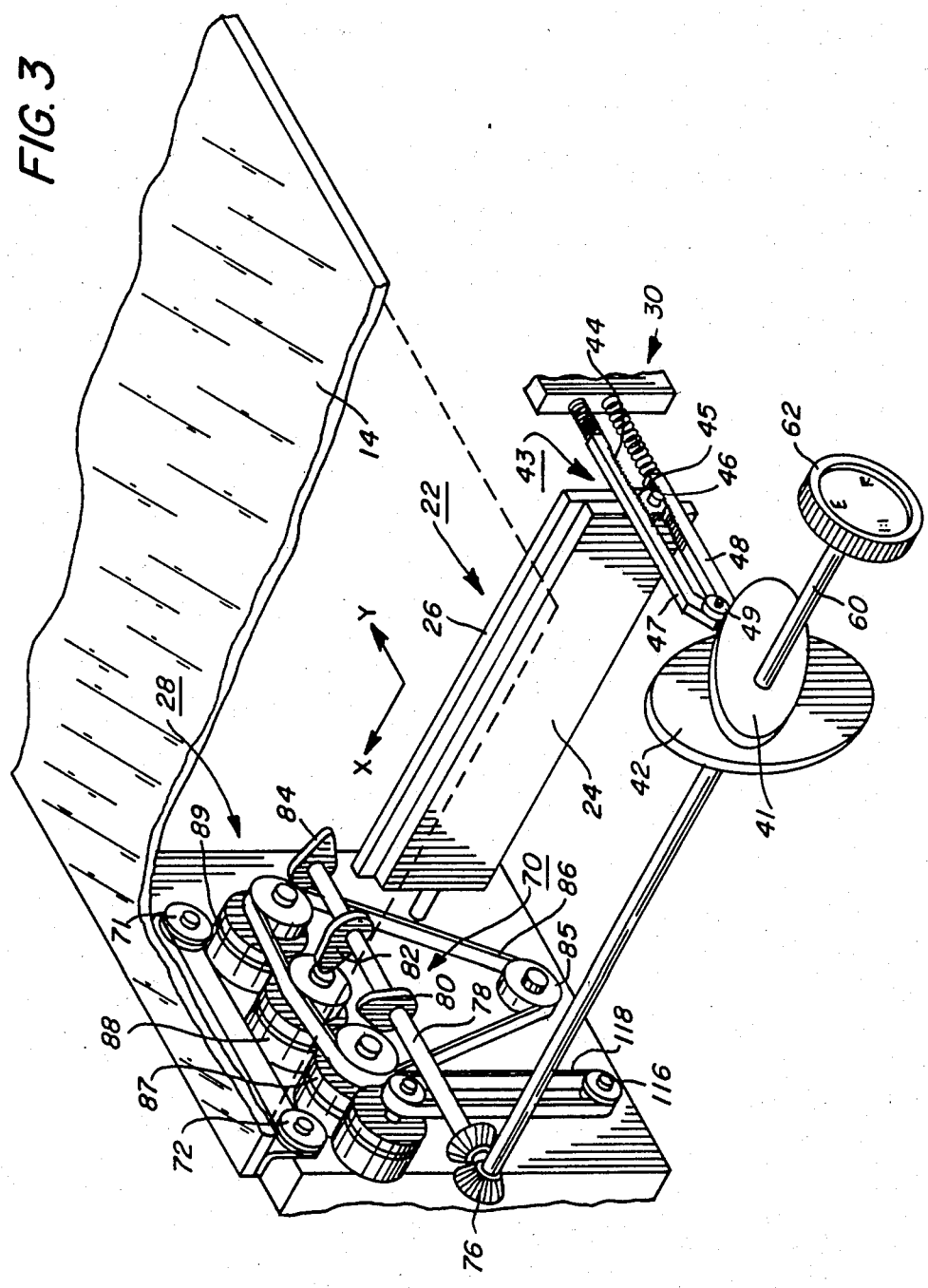

MULTI-MAGNIFICATION REPRODUCTION DEVICE UTILIZING LINEAR LENS ASSEMBLY

BACKGROUND AND PRIOR ART STATEMENT

The present invention relates to an electrophotographic reproduction device utilizing an assembly of linear lens arrays to project a document image onto a photosensitive image plane; each lens array associated with a particular magnification characteristic. More particularly, the present invention relates to mechanical drive arrangements for placing the appropriate lens array into an optical imaging path following selection of the desired document magnification value.

Linear image transmitters used to transmit images of an object on an object plane to an image plane are known to the art in several forms. An array of lenslets formed vertically in a linear form and known as strip lenses are disclosed in U.S. Pat. No. 3,544,190. A plurality of optical light pipe fibers formed into a linear image transmitter is disclosed in U.S. Pat. No. 4,194,827. A third type of linear lens, one finding current usage in a number of reproduction devices, comprises a plurality of bundled gradient index optical fibers. As described in U.S. Pat. No. 3,658,407, a light conducting fiber made of glass or synthetic resin has a refractive index distribution in a cross-section thereof that varies parobolically outward from a center portion thereof. Each fiber acts as a focusing lens to transmit part of an image of an object placed near one end. An assembly of fibers, in a staggered two-row array, transmits and focuses an image of the object on an image plane. The fiber lenses are produced under the trade name "SELFOC"; the mark is registered in Japan and owned by Nippon Sheet Glass Co., Ltd.

In the above-identified linear image transmitting systems, the lens arrays disclosed form images at a photosensivite image plane at a magnification of 1:1. In at least the case of the gradient index lens configuration, a second lens array adapted to form reduced or enlarged images of the object at the image plane may be used in conjunction with the unity magnification lens, to enable a multi-magnification reproduction device. A gradient index lens capable of forming reduced or enlarged images at an image plane is disclosed in U.S. Pat. No. 4,331,380 assigned to the same assignee as the present invention. As disclosed therein a multi-magnification gradient index lens assembly is formed by combining two or more gradient index lens arrays, each array designed to form images transmitted therethrough at a specific magnification at the image plane. The positioning of the appropriate lens array in the optical path, and the rotation of the lens assembly to change the magnification from reduction to enlargement, is disclosed in general terms.

All of the above cited references are incorporated by reference herein for appropriate teachings of additional or alternative details, features and/or technical background.

The present invention is directed towards a preferred mechanical arrangement for accomplishing the positioning of one of a plurality of linear lens arrays in a multi-magnification reproduction system. More particularly, the invention relates to an imaging system for a multi-magnification electrophotographic reproduction device wherein a document on an object plane is reproduced on a photosensitive image plane at a selected magnification, said system comprising:

a first linear lens array positioned between the object and image plane, said first array adapted to transmit an image of said document onto said image plane at a first magnification, at least a second linear lens array positioned between the object and image planes, said second lens array adapted to transmit an image of said document onto said image plane at a second magnification, means for providing relative movement between document, lens array assembly and image plane for a selected magnification, means for illuminating a narrow longitudinal strip of said document, and means for providing lateral and rotational movement to said lens array assembly.

DRAWINGS

FIG. 3 is a partial top perspective view of the system of FIG. 1 showing the platen drive and/lens positon drive mechanical arrangements.

DESCRIPTION

Figure 1:
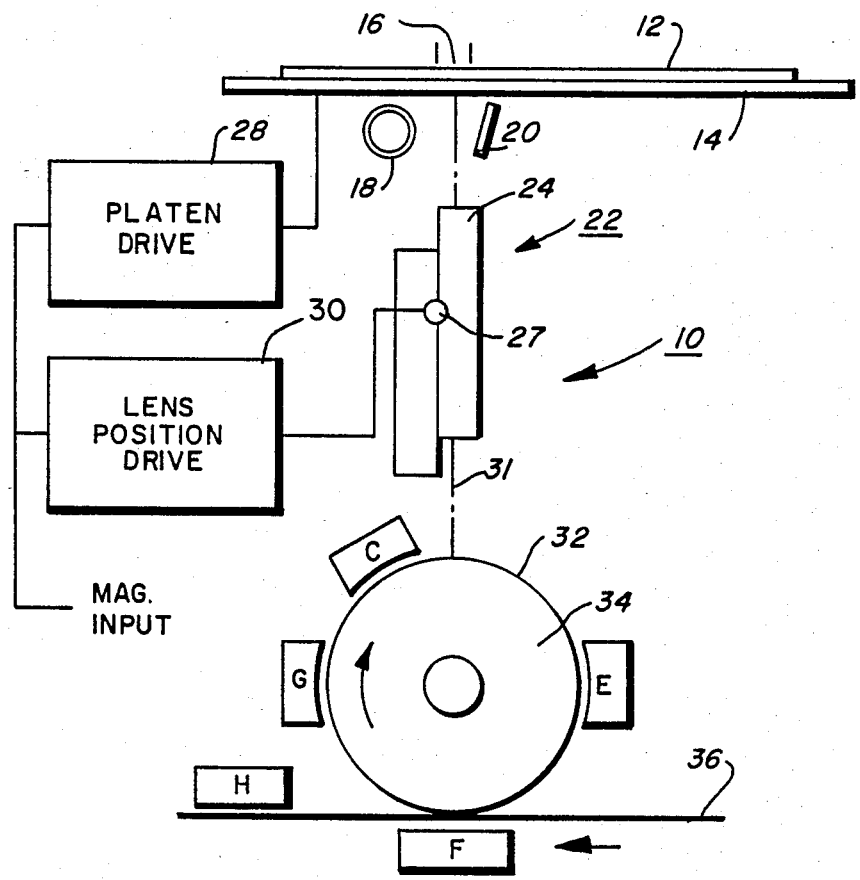
FIG. 1 is a schematic end view of a multi-magnification reproduction device utilizing a linear gradient index lens assembly comprising a unity magnification lens array and a reduction/enlargement lens array.

Referring now to FIG. 1, there is shown in schematic side view, an electrophotographic system 10 capable of reproducing documents 12 at a plurality of magnification. Document 12 is placed on platen 14 adapted to move past a narrow illumination strip 16 formed by light directed from a linear lamp 18 acting in combination with associated linear reflector 20. Imaging assembly 22 consists of a conventional 1X gradient index lens array 24 and a 0.707X/1.414X gradient index lens array 26. The lens arrays are connected at axis of rotation 27. Lens array 26 is constructed according to the principles set forth in forementioned U.S. Pat. No. 4,331,30. It is understood, however, that the invention can be utilized with other types of linear lens arrays capable of reproducing images at two or more magnifications.

In operation, a magnification mode is selected by the operator at the control panel of the particular reproduction device enabling platen drive system 28 and lens position drive system 30. Platen drive system 28, as will be described in further detail below, moves the platen at the scan speed required for the particular magnification selected. Lens position drive system 30, also described in further detail below, moves the appropriate lens array into the optical path and rotates the reduction/enlargement lens 22, as required. In FIG. 1, 1X lens 24 is shown in the transmitting position lying along optical path 31.

The document 12 incrementally scanned at scan strip 16 as platen 14 is moved past strip 16 at the selected speed by system 28. The reflected image is transmitted through the selected lens array and is focused as an erect image, at the magnification of the transmitting lens array, on the photosensitive surface 32 of a drum 34 rotating in the indicated direction. Surface 32, having received an electrostatic charge at station C, is then exposed in image-wise fashion. The latent image of document 12 is developed at development station E by application of toner material of appropriate polarity. The developed image is brought into contact with support sheet 36 within a transfer station F and the toner image is electrostatically attracted from the surface 32 to the contacting side of the support sheet. Any residual toner particles remaining on the surface 32 after the completion of the transfer operation are removed within a cleaning station G, placing the surface in a condition to repeat the process. After the transfer operation, the image-bearing support sheet is forwarded to a fusing station H via a suitable conveyor. These xerographic processing steps are well known in the art as exemplified in U.S. Pat. No. 4,397,409 whose contents are hereby incorporated by reference.

From the above description, it is evident that the imaging assembly 22 can provide 3 magnifications, depending upon the position and orientation of the particular lens array. In FIG. 1, as shown, 1X lens array 24 lies along optical path 31 and the image is transmitted to surface 32 at 1X magnification. If lens array 26 is rotated 180° clockwise, it will be aligned along optical path 31 and the image will be transmitted to the drum surface at a 1.414 enlargement. And if array 26 is moved to the right into the optical path and rotated 180° counterclockwise, a reduced image will be transmitted to the drum surface at 1.414X. These relationships are shown in FIG. 2.

Figure 2A:
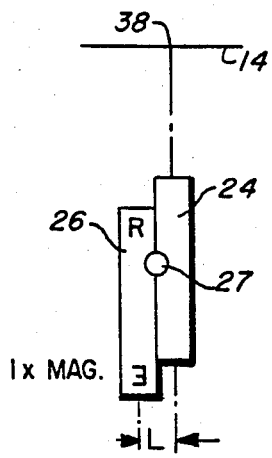
FIG. 2a, 2b, 2c represent end views of the lens assembly of FIG. 1 in 1X enlargement, and reduction magnification positions respectively.

FIG. 2a shows the positioning of 1X lens array 24 aligned with a registration point 38 in the center of scan strip 16. The distance L is the distance between the centerline of arrays 24, 26.

Figure 2B:
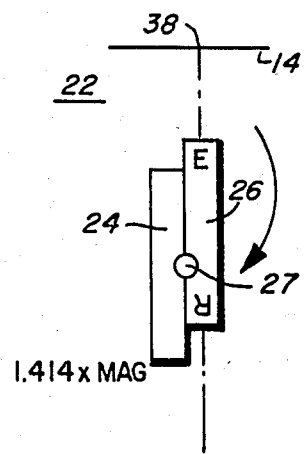

FIG. 2b shows the lens assembly 22 in the 1.414X magnification position. The entire assembly has been rotated 180° clockwise about axis 27 placing array 26 in the enlarging position.

Figure 2C:
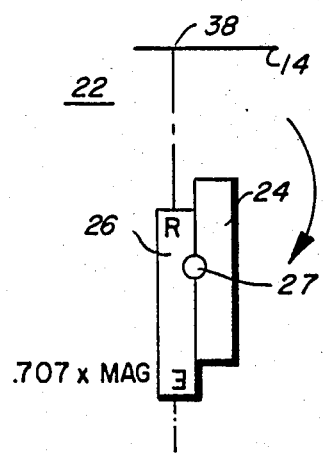

FIG. 2c shows the lens assembly with lens array 26 in the 0.707X reduction position. The entire assembly has been rotated 180° counterclockwise (from the FIG. 2b position) and moved a distance L to the right. These lateral and rotational motions of assembly 22 are accomplished by lens position drive system 30 shown in FIG. 3.

FIG. 3 is a partial perspective view of the imaging portion of system 10 with a portion of platen 14 cut away to show the details of platen drive system 28 and lens position drive system 30. Lens assembly 22 is shown in the enlargement mode corresponding to the FIG. 2b orientation. Lens position drive 30 includes a pair of lens position cams 41, 42, a rack and pinion assembly 43 comprising a first movable rack 44, a second movable rack 45 and pinion 46. Racks 44, 45 are connected by rods 47, 48 to cam followers 49, 50 respectively. The instant position of lens position cams 41, 42 is controlled by the angular orientation of control shaft 60 which, in turn, is connected to a magnification control knob 62. Knob 62 has three magnification positions "E", "R" and "1:1" and is adapted to turn shaft 60 to one of three positions. Cams 41, 42 then have three possible configurations and their rotation is translated, via rack and pinion assembly 43, to the lens assembly 22 via a lens axis rotation shaft (not visible) connected between pinion 46 and axis 27 of assembly 22. The position of each cam 41, 42 for each magnification position is shown in FIGS. 4a, b, c with the positions corresponding to FIGS. 2 a, 2b, 2c.

Figure 4A:
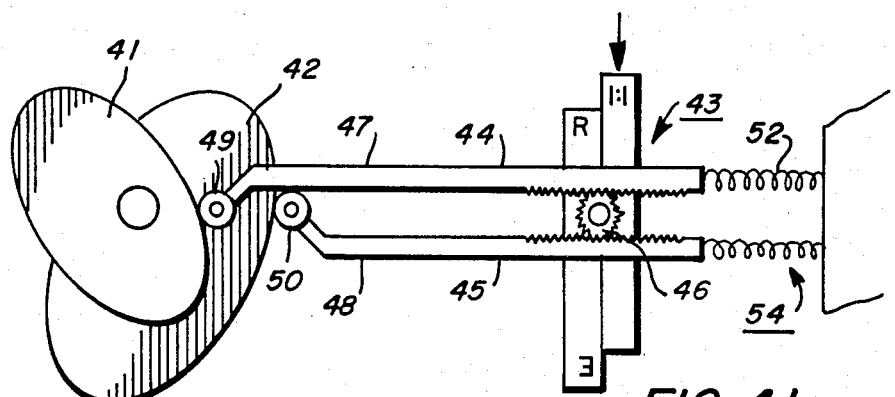
FIGS. 4a, 4b, 4c are end view schematics of the platen and lens drives of FIG. 3 for each of three magnification positions.
Figure 4B:
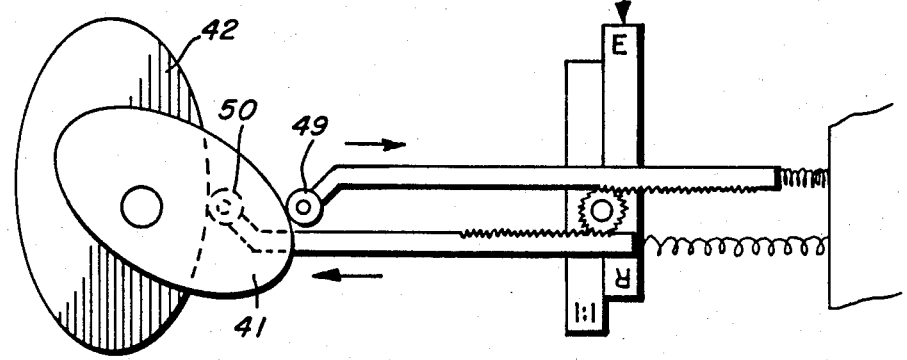

Referring to FIG. 4a, cams 41, 42 are shown in the angular position resulting when control knob 62 is turned to the 1X position. Lens array 24 is thus centered on optical path 31. Upon selection of the enlargement magnification (E) by control 62, the cams rotate 120° clockwise as shown in 4b. This cam rotation is translated via cam followers 49, 50 and rods 47, 48 to rack and pinion assembly 43. Rack 44 moves to the right a distance of ½ of the pitch of pinion 46 circumference. Rack 45 is translated to the left the same distance. This rack translation causes the lens assembly 22 to rotate about axis 27 180° thus placing lens 26 in the optical path and in the enlargement position shown in FIG. 4b.

Figure 4C:
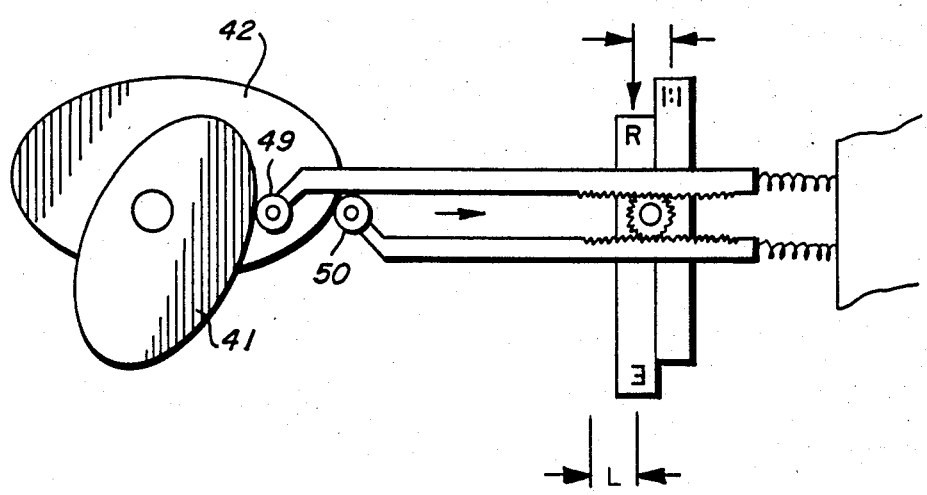

FIG. 4c shows the cam assembly rotated an addtional 120° in response to selection of reduction (R) at knob 62. Rack 44 is translated to the left and rack 45 to the right causing a net movement of assembly 22 a distance L to the right and a 180° counterclockwise rotation of lens assembly 22. A further rotation of knob 62 to the 1X position would return the lens assembly 22 to the 1X (4a) position.

Spring pairs provide bias forces agains cam followers 49, 50.

From the above-description, there has been provided an effective method of bringing the desired magnification lens into position to effect the magnification selected by an operator. The principles of operation are applicable for imaging systems having more than two lens arrays, simply requiring modification to the cam and rack and pinion assemblies to accommodate the added movements. The mechanical drive arrangements initiated by the control knob 62 could be replaced, if desired, by electrical drive signals to engage cam rotation as is known in the art.

Figure 5:
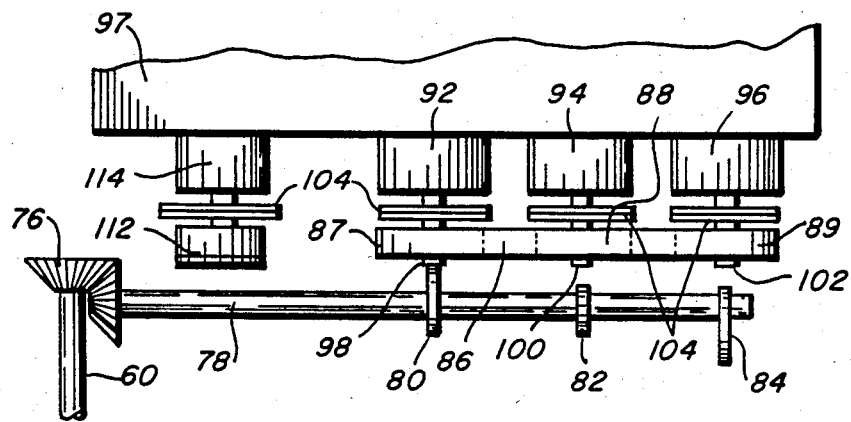
FIG. 5 is a top view of the platen drive components.

Turning now to the mechanical platen drive arrangement, there is shown in FIG. 3, an exemplary embodiment of such a drive system. Platen drive 28 consists, generally, of a cam/pulley/cable drive 70 which is adapted to provide three scan speeds, each associated with one of the three possible system magnifications. In addition, the drive system is adapted to provide a fourth, rescan, speed. The 1X magnification requires a scan speed equal to the process speed for the system; the 0.707X magnification requires an increase in scan speed and the 1.414X a decrease in scan speed. In addition, a very rapid rescan speed (platen returning to start of scan) is provided. These speeds are provided by system 28 shown in FIG. 3 and in FIGS. 5, 6 and 7.

Referring to these figures, platen 14 is driven by scan roller 71 or rescan roller 72 which frictionally engage the bottom of the platen along the edges thereof. The rollers 71, 72 are driven by drive 70 which operates in the following manner.

Upon selection of a magnification mode at control 62, shaft 60 turns a bevel gear assembly 76. This assembly transmits the shaft 60 rotation to pulley drive shaft 78. Attached to shaft 78 are cams 80, 82, 84, associated with scan pulleys 87, 88, 89 respectively. Each pulley in turn has an associated sheave 92, 94, 96 connected to machine frame 97. These pulleys rotate in a clockwise direction when a scan clutch 85 is engaged at the start of scan, driving timing belt 86. Each pulley has a different pitch diameter selected to provide the angular velocity which is translated into the appropriate platen speed via scan roller 71. Thus pulley 87 provides the platen speed required for 1X magnification, pulley 89 for 0.707X and pulley 1.414X.

When the appropriate cam comes in contact with associated ball bearing 98, 100, 102 the ball bearing forces the associated pulley (see FIG. 5) against its sheave thereby transmitting torque through the friction disc 104. Cams 80, 82, 84 are arranged on shaft 78 such that only one pulley/sheave pair can be engaged at one time. The pulleys, besides rotating on their own shafts, can also move a slight distance in the Y direction (as shown in FIG. 3) so as to provide a small amount of clearance between sheave and pulley. The sheaves also turn on their shafts but the Y movement is limited by a thrust bearing (not shown).

Figure 6:
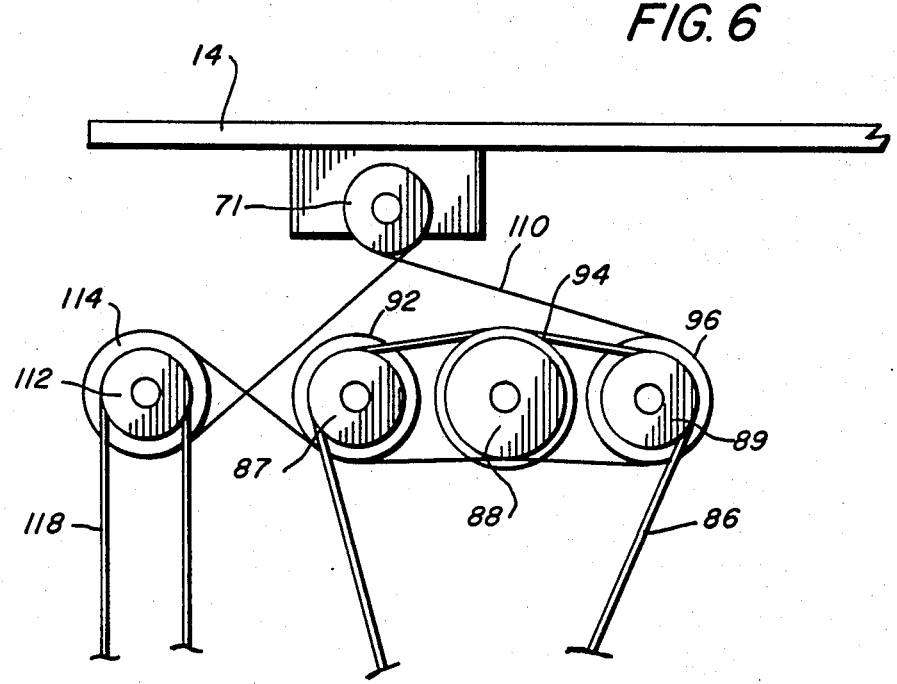
FIG. 6 is a side view of the platen drive components.
Figure 7:
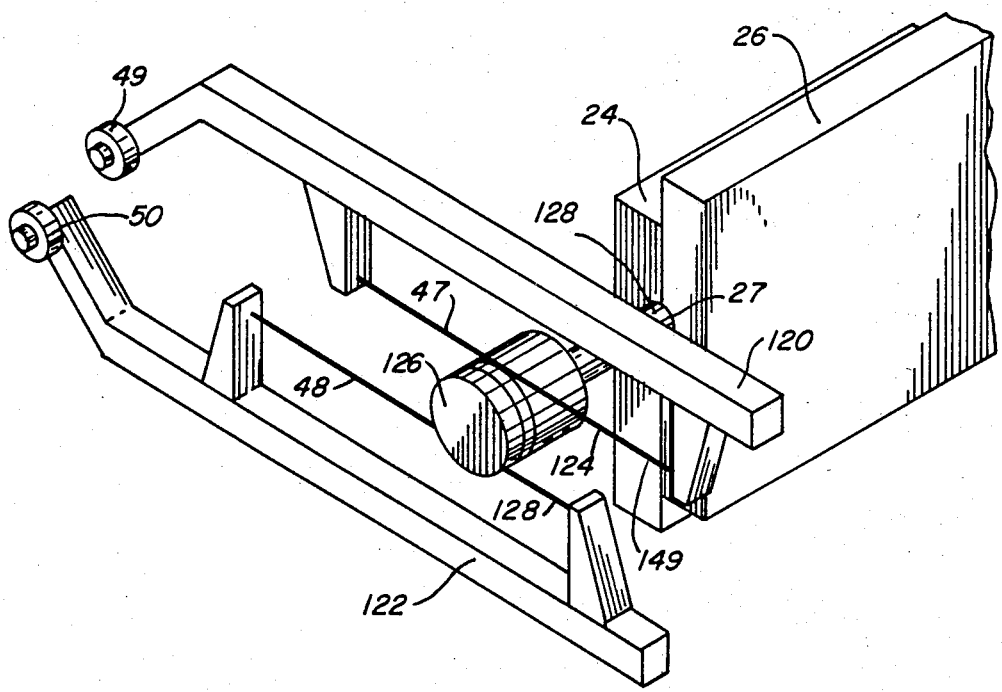
FIG. 7 is a second embodiment of a portion of the lens positioning drive.

Drive cable 110 is entrained about pulleys 87, 88 and 89 and about rescan pulley 112, which drives rescan roller 72. FIGS. 6 and 7 show the cable path over the sheaves and pulleys for the scan mode. During the scan cycle, pulleys 87, 88 and 89 will rotate clockwise; the engaged sheave also rotates clockwise, providing a lateral leftward motion to the platen. Rescan pulley 112 and associated sheave 114 rotate counterclockwise when a rescan clutch 116 is engaged, driving rescan timing belt 118. Upon energization of the rescan clutch, pulley 112 rotates clockwise causing a lateral motion of the platen to the right.

From the above description, and according to one aspect of the invention, it is apparent that a multi-magnification system is effectively enabled by coupling the platen drive 28 and lens position drive 30 together via the control knob 62, shaft 60, bevel gear assembly 86 and shaft 78. Rotation of the control knob or of shaft 60, can be effected either manually or by stepper motors or the like.

FIG. 7 illustrates a variation of the lens position drive 30 wherein a capstan/cable arrangement replaces the rack and pinion assembly. Rods 47, 48 in this arrangement, are connected to movable cable support members 120, 122 (which replace racks 44, 45). Cable 124 is connected to the ends of member 120 and entrained around one end of capstan 126 (which replaces pinion 46). Cable 128 is connected to the ends of members 122 and entrained around another portion of capstan 126. Capstan shaft 128 is connected to rotational axis 27 of assembly 22. The operation of this drive arrangement is the same as described for the rack and pinion arrangement of FIGS. 3 and 4 with the cam 41, 42 rotation now causing lateral movement of the cable supports and rotation of the capstan. The motions are translated into the appropriate translational and lateral movements of assembly 22.

In conclusion, it may be seen that there has been disclosed a novel electrophotographic imaging system. The exemplary embodiments described herein are presently preferred, however, it is contemplated that further variations and modifications within the purview of those skilled in the art can be made herein. For example, although the document has been shown as positioned on a platen which, in turn, is moved through a scanning zone the invention may be practiced in a CVT mode wherein the document is moved through the scan zone. Other types of linear image transmitting devices may also be arranged to comprise the lens assembly. The following claims are intended to cover all such variations and modifications as fall within the spirit and scope of the invention.

What is claimed is:

1. An imaging system for a multi-magnification electrophotographic reproduction device wherein a document on an object plane is reproduced on a photosensitive image plane at a selected magnification said system comprising:
    a first linear lens array positioned between the object and image plane, said first array adapted to transmit an image of said document onto said image plane at a first magnification,
    at least a second linear lens array positioned between the object and image planes, said second lens array adapted to transmit an image of said document onto said image plane at a second magnification,
    means for providing relative movement between document, lens array assembly and image plane for the selected magnification,
    means for illuminating a narrow longitudinal strip of said document, and
    means for providing lateral and rotational movement to said lens array assembly so as to position a selected lens array of appropriate magnification into the image transmitting position wherein said means for providing relative movement and said means for providing lateral and rotational movement are simultaneously enabled by a common drive means.

2. The imaging system of claim 1 wherein said means for providing lateral and rotational movement to said lens array assembly includes a rack and pinion assembly operatively connected between said common drive means and said lens array assembly.

3. The imaging system of claim 1 wherein said first and second linear lens arrays are gradient index lens arrays.

* * * * *